Oct. 2, 1956　　　A. M. GROSSFELD　　　2,764,775
WIPING IMPLEMENT WITH GROOVED BEADED STRIP
Filed Aug. 3, 1953

INVENTOR.
Aaron Grossfeld
BY
William F. Nickel
ATTORNEY

United States Patent Office 2,764,775
Patented Oct. 2, 1956

2,764,775

WIPING IMPLEMENT WITH GROOVED BEADED STRIP

Aaron M. Grossfeld, Bronx, N. Y.

Application August 3, 1953, Serial No. 371,797

4 Claims. (Cl. 15—245)

I have invented an improvement in wipers for surfaces that have water or moisture or other deposits thereon, such as windowpanes after they have been washed, so that the wetness can be removed and the surfaces dried more quickly.

Such wipers generally comprise a cross bar or plate having a handle, a strip of rubber or other suitable material being attached to the bar and projecting along one edge. An important object of this invention is to provide a strip of rubber, or the like, of superior construction, capable of being readily secured, without extra fastening devices, to the cross bar or plate, and operating with greatest efficiency when it is drawn across a surface having a film or layer thereon to be removed.

The nature of the invention is clearly set forth in the ensuing description and the novel features are defined in the claims. The accompanying drawings illustrate the best form of the invention now known to me; but this disclosure is explanatory only, and I may vary the shape, size and arrangement of parts without deviation from the general plan in which the invention resides.

Figure 1:
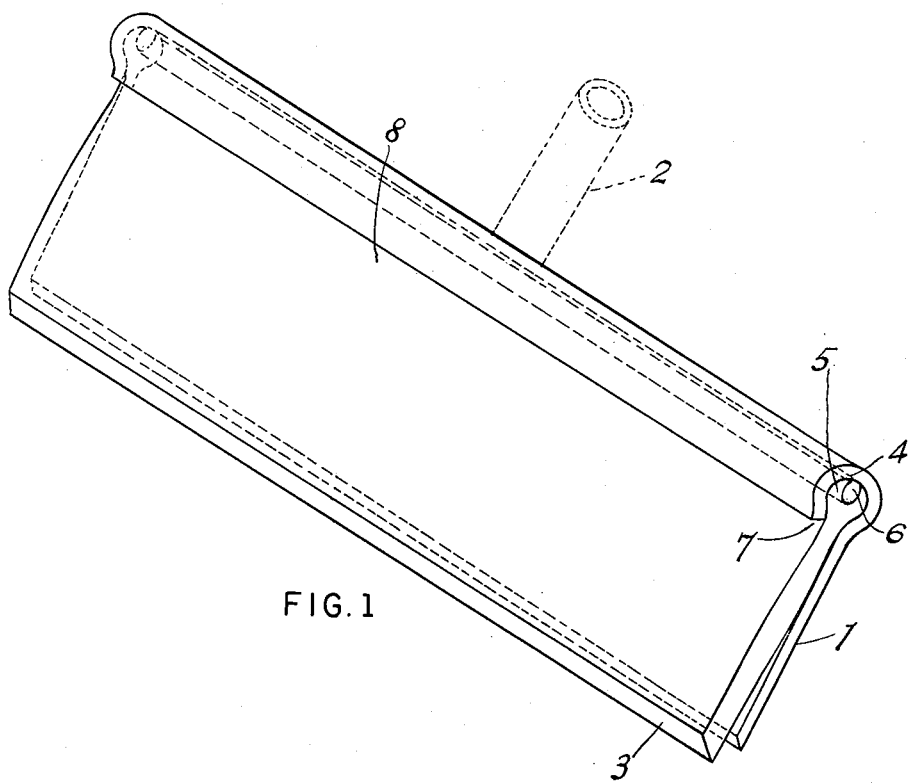
Figure 1 is a perspective view of a cross bar or plate and wiping strip according to my invention.

The crossbar or plate is indicated at 1 with a hollow boss 2 projecting from the rear at the middle for a handle (not shown). Any means for attaching the handle may be utilized. The member 1 is usually a strip of metal, and combined with the plate 1 is a strip of rubber 3 or other suitable material which extends from end to end of the plate and projects a short distance beyond the front edge of said plate.

The plate 1 is curled or bent over to clamp and hold the strip 3 in place. The strip 3 has a thickened edge forming a bead 5 along its top, and the bead has a groove 6 therein. The size of the channel 4 on the plate 1 and bead 5 are such that the channel will engage the bead 5 snugly and the space between the edge of the channel and the body of the plate forms a slot 7 through which the body of the strip 3 projects. The bead 5 is thicker than the slot 7; hence the strip is securely held on the plate 1. To unite the strip to the plate, the bead 5 is pushed endwise into the overturned edge forming the channel 4. The presence of the long space or groove 6 in the bead 5 enables the parts of the bead at the opposite sides of the groove 6 to be compressed and pushed into position more easily, when finally in the channel the sides of the bead expand and make firm contact with the inner surface of the channel 4 and the strip is thus securely attached to the plate 1. When the edge of the plate 1 is bent over to make the channel 4, a hollow bead is formed along said edge with the channel 4 inside.

Figure 2:
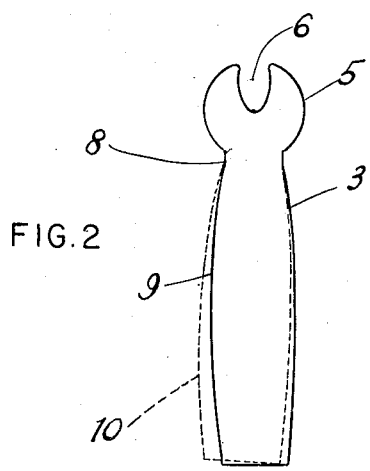
Figure 2 is an end view of the wiping strip, somewhat enlarged.

The wiper with a strip 3 of this design can be used very effectively to make strokes both ways, with either the plate 1 or the strip 3 leading. When the strip 3 faces in the direction of movement the free edge of the strip opposite the bead is pressed against the adjacent edge of the plate. During a stroke in the opposite direction the channel 4 holds the strip, but the latter can bend along its length at the slot 7. I have found that the strip in this position operates to much better advantage if it is slightly thinner at a part along the bead 5, as indicated at 8 on Figure 2, and has its sides or faces 9 convex from this part to the outer or free edge. Any bending of the strip 3 away from the plate 1 thus takes place along a part 8 at the junction of the bead 5 with the body of the strip 3, as indicated on Figure 3 by the broken lines 10. Hence the outer or free edge of the strip 3 always makes uniform contact with the surface to be wiped and excellent action is secured. If the strip 3 were not thinned a little along the bead, it might bend along its length elsewhere than near the bead, and at unequal distances therefrom, especially when the strip 1 is in leading position; that is in front of the plate in the direction of motion; and the free edge would then not make contact with said surface at uniform pressure along the entire free edge and some of the moisture or wetness or other substance would be skipped and left on the surface.

The channel 4 and bead 5 can of course have cross sectional shape different from the shape appearing on the drawings.

My invention is therefore well adapted to serve its purpose. The strip of rubber 3 and plate 1 can be inexpensively produced, are easily assembled and give satisfactory results in practical use. It is made with the proper length and width as required.

When the strip 3 and plate 1 are assembled, they should diverge a little from the channel 4 and bead 5 towards their outer free edges, as they appear in Figure 1.

If the wiper has to be used in such a way that the upper corner of the strip 3 along the free edge portion, as the strip is shown on Figure 1, for example, is worn off, the strip 3 can be detached from the plate or bar 1 and reversed.

The sides or faces 9 can also be flat and parallel, as well as convex, but the thinned part 8 must be retained. The groove 6 preferably has the cross sectional shape illustrated with concave converging sides. Of course the implement can be used for wiping other substances than water from any surface that needs to be wiped or cleaned.

Having described my invention, what I believe to be new is:

1. A wiping implement comprising a flat elongated bar with an overturned clamping edge forming a hollow channel with a slot separating said edge from the bar, a flat elongated strip of wiping material having a bead along its edge fitting said channel and movable endwise into the channel, said bead being clamped to the bar by said edge and having an open longitudinal groove therein and being thinner along its length adjacent said bead, the strip being superposed on the bar and the bar having a width such that its opposite edge lies adjacent but short of the opposite edge of the strip.

2. A wiping implement comprising a flat elongated strip of wiping material having a relatively thick bead along one edge, said bead having an open groove therein extending from end to end, the sides of said strip being slightly convex from end to end between the bead and the opposite edge, the strip being thinnest at the junction of the sides with the bead, and a flat elongated supporting bar on which the strip is superposed and to which one edge of said strip is attached by said bead, the strip overlapping the opposite edge of said bar.

3. A wiping implement comprising a flat elongated strip of flexible material for wiping a surface, said strip having opposite longitudinal edges, one of said edges being thickened and comprising longitudinally extending portions with a space open along its length between them running from end to end of the strip, said thickened edge being compressible along the sides of said space, the sides of the strip from the thickened edge to the opposite edge being slightly convex, said strip being thinned adjacent a line at the junction of said sides and said thickened edge, and a flat elongated bar to one edge of which the strip is attached along said thickened edge, the opposite edge of said strip overlapping the adjacent edge of said bar.

4. A wiping implement comprising a flat elongated strip of flexible material for wiping a surface, said strip having opposite longitudinal edges, one of said edges being thickened and comprising longitudinally extending portions with a space between them runnnig from end to end of the strip, said thickened edge being compressible along the sides of said space, said strip being thinned adjacent a line at the junction of said sides and said thickened edge, and a flat elongated bar to one edge of which the strip is attached along said thickened edge, the opposite edge of said strip overlapping the adjacent edge of said bar.

References Cited in the file of this patent
UNITED STATES PATENTS

| | | |
|---|---|---|
| 355,298 | Bourke | Jan. 4, 1887 |
| 730,843 | Rostek | June 9, 1903 |
| 1,853,715 | Anderson | Apr. 12, 1932 |
| 2,589,339 | Carson | Mar. 18, 1952 |
| 2,598,971 | Carey | June 3, 1952 |